(12) United States Patent
Hashimoto et al.

(10) Patent No.: US 8,142,098 B2
(45) Date of Patent: Mar. 27, 2012

(54) ASSEMBLY MEMBER AND METHOD OF MANUFACTURING ASSEMBLY MEMBER

(75) Inventors: Yu Hashimoto, Toyota (JP); Yoshihiko Ukai, Toyota (JP); Keiichi Matsunaga, Anjo (JP)

(73) Assignees: Toyota Jidosha Kabushiki Kaisha, Toyota (JP); MEG Inc., Anjo-shi (JP)

( * ) Notice: Subject to any disclaimer, the term of this patent is extended or adjusted under 35 U.S.C. 154(b) by 369 days.

(21) Appl. No.: 12/309,812

(22) PCT Filed: Jul. 31, 2006

(86) PCT No.: PCT/JP2006/315177
§ 371 (c)(1),
(2), (4) Date: Feb. 24, 2009

(87) PCT Pub. No.: WO2008/015735
PCT Pub. Date: Feb. 7, 2008

(65) Prior Publication Data
US 2009/0317181 A1 Dec. 24, 2009

(51) Int. Cl.
*F16D 1/072* (2006.01)

(52) U.S. Cl. .......... 403/280; 403/282; 403/361; 29/521; 29/888.08

(58) Field of Classification Search .......... 403/361, 403/280, 282, 284, 298, 359.1, 359.6; 411/339, 411/451.1, 454.4, 452; 29/505, 521, 888.08
See application file for complete search history.

(56) References Cited

U.S. PATENT DOCUMENTS

| | | | | |
|---|---|---|---|---|
| 2,056,309 A | * | 10/1936 | Osenberg | 411/453 |
| 4,421,497 A | * | 12/1983 | Federmann et al. | 464/181 |
| 4,666,345 A | * | 5/1987 | Seegmiller | 411/452 |
| 4,922,785 A | * | 5/1990 | Arnold et al. | 74/567 |
| 2002/0041790 A1 | * | 4/2002 | Suzuki et al. | 403/280 |
| 2002/0195291 A1 | * | 12/2002 | Nonogaki | 180/337 |

FOREIGN PATENT DOCUMENTS

| | | |
|---|---|---|
| FR | 2 687 093 A1 | 8/1993 |
| JP | U-50-152028 | 12/1975 |
| JP | U-51-109369 | 9/1976 |
| JP | U-57-134410 | 8/1982 |
| JP | A-58-030510 | 2/1983 |
| JP | U-60-088110 | 6/1985 |
| JP | A-60-129412 | 7/1985 |

(Continued)

OTHER PUBLICATIONS

Chinese Office Action issued in Chinese Patent Application No. 200680055510.2 on Dec. 21, 2010 (with translation).

(Continued)

*Primary Examiner* — Michael P Ferguson
(74) *Attorney, Agent, or Firm* — Oliff & Berridge, PLC

(57) ABSTRACT

Technology which enables a first member and a second member to be firmly fastened together is provided. A bar-shaped section is formed on the first member, a hole is formed in the second member, and the bar-shaped section of the first member is pressure fitted into the hole of the second member. Here, peak sections which extend intermittently in the axial direction or peak sections which extend obliquely with respect to the axial direction are formed in a repeating fashion in the circumferential direction, on the side face of the harder of the bar-shaped member and the hole.

2 Claims, 14 Drawing Sheets

FOREIGN PATENT DOCUMENTS

| | | |
|---|---|---|
| JP | A-63-89229 | 4/1988 |
| JP | U-2-80224 | 6/1990 |
| JP | A-3-297600 | 12/1991 |
| JP | A-4-69407 | 3/1992 |
| JP | A-7-259838 | 10/1995 |
| JP | A-8-74871 | 3/1996 |
| JP | A-8-121120 | 5/1996 |
| JP | A-9-158952 | 6/1997 |
| JP | A-9-287677 | 11/1997 |
| JP | A-11-320274 | 11/1999 |
| JP | A-2002-126837 | 5/2002 |
| JP | A-2003-4060 | 1/2003 |
| JP | A-2003-161332 | 6/2003 |
| JP | A-2004-195475 | 7/2004 |

OTHER PUBLICATIONS

Co-pending U.S. Appl. No. 12/309,818, filed Feb. 24, 2009 in the name of Hashimoto et al.
International Search Report issued in International Application No. PCT/JP2006/315176 dated Oct. 31, 2006 (with translation).
International Search Report issued in International Application No. PCT/JP2006/315177 dated Oct. 31, 2006 (with translation).
Chinese Office Action issued in Chinese Patent Application No. CN 200680055494.7 dated May 18, 2010 (with translation).
Chinese Office Action issued in Chinese Patent Application No. CN 200680055510.2 dated Apr. 27, 2010 (with translation).
Japanese Office Action issued in Japanese Patent Application No. 2005-024184 dated Jun. 1, 2010 (with translation).
International Preliminary Report on Patentability issued in International Application No. PCT/JP2006/315177 dated Sep. 26, 2008 (with translation).
International Preliminary Report on Patentability issued in International Application No. PCT/JP2006/315176 dated Sep. 26, 2008 (with translation).
Jul. 22, 2011 Office Action mailed in related U.S. Appl. No. 12/309,818.
Jun. 29, 2011 Office Action issued in Chinese Application No. 200680055494.7 w/partial translation.
Mar. 22, 2011 Japanese Office Action for Application No. 2005-024184 w/Translation.
Jan. 17, 2012 Office Action issued in Japanese Patent Application No. 2008-527609 (with translation).

* cited by examiner

ASSEMBLY MEMBER AND METHOD OF MANUFACTURING ASSEMBLY MEMBER

BACKGROUND OF THE INVENTION

1. Field of the Invention

The present invention relates to technology for fastening together a pair of members.

2. Description of the Related Art

Japanese Patent Application Publication No. S63-89229 discloses technology for pressure fitting a bar-shaped infitting section which is formed with a triangular toothed serrations into a pipe and thereby fastening the respective members together. In this technology, the infitting section is made to have a greater hardness than the pipe. When the infitting section is pressure fitted into the pipe, then the infitting section and the pipe are fastened by means of the peaks of the triangular tooth serrations piercing into the inner circumferential surface of the pipe.

SUMMARY OF THE INVENTION

In the prior art technology described above, the triangular tooth serrations are formed uniformly in the axial direction and the height of the peaks of these serrations are maintained at a uniform height. For this reason, when a bar-shaped fitting section and a pipe are fastened together, then the fastening force in the axial direction may be insufficient. The present invention resolves the problems described above, by providing technology which enables a pair of members to be fastened together strongly.

The technology according to the present invention can be realized in a method of manufacturing an assembly member in which a first member and a second member are fastened together. This method of manufacture comprises a step of forming a bar-shaped section on the first member; a step of forming a hole in the second member; and a step of pressure fitting the bar-shaped section formed on the first member into the hole formed in the second member. Peak sections which extend intermittently in the axial direction or peak sections which extend obliquely with respect to the axial direction are formed in a repeating fashion in the circumferential direction on a side face of one of the bar-shaped member and the hole that has greater hardness.

In this method of manufacture, when the bar-shaped section is pressure fitted into the hole, the peak sections formed on the side face having greater hardness pierce into the side face having lower hardness. Since the peak sections formed on the side face having greater hardness either extend with interval therebetween in the axial direction or extend obliquely with respect to the axial direction, then the side face of the bar-shaped section and the side face of the hole are fastened firmly in respect of both the circumferential direction and the axial direction.

By the configuration of this method of manufacture, it is possible to manufacture an assembly member in which a first member and a second member are fastened together strongly.

Preferably, projections extending in the axial direction are formed repeatedly in the circumferential direction on the side face of the one of the bar-shaped section and the hole that has the greater hardness. In this case, desirably, a recess section is formed in at least one position within the projections.

By this configuration, it is possible to form peak sections which extend intermittently in the axial direction, in the side face of one of the bar-shaped section and the hole with greater hardness.

If the projections extending in the axial direction each comprise a portion in which the height increases uniformly in the axial direction as well as a portion in which the height remains uniform in the axial direction, then desirably the recess section is formed in the portion where the height of the projections remains uniform in the axial direction.

If the recess section is to be formed within the projections, it is possible to prevent excessive increase in the pressure fitting force during the pressure fitting of the bar-shaped section into the holes; especially by forming the recess section in the portion where the height of the projections remain uniform in the axial direction.

Preferably, projections extending obliquely in the axial direction are formed repeatedly in the circumferential direction on the side face of the one of the bar-shaped section and the hole with greater hardness.

By this configuration, it is possible to form peak sections which extend obliquely in the axial direction, in the side face of the bar-shaped section or the hole with greater hardness.

Desirably, a portion in which projections proceed obliquely in one direction with respect to the axial direction are formed in a repeating fashion in the circumferential direction and a portion in which projections proceed obliquely in the other direction with respect to the axial direction are formed in a repeating fashion in the circumferential direction are respectively formed so as to compose the peak sections which extend obliquely with respect to the axial direction on the side face of the one of the bar-shaped section and the hole has the greatest hardness with greater hardness.

Thereby, it is possible to fasten together the side face of the bar-shaped section and the side face of the hole more strongly in respect of both the circumferential direction as well as the axial direction.

By means of the methods of manufacture described above, it is possible to manufacture an assembly member in which a first member and a second member are firmly fastened together. This assembly member has the following characteristic features that are obtained by utilizing one of the methods of manufacture described above. More specifically, the assembly member is an assembly member in which a first member and a second member are fastened together, in which a bar-shaped section is formed on the first member, a hole into which the bar-shaped section is pressure fitted is formed in the second member, and peak sections extending intermittently in the axial direction or peak sections extending obliquely with respect to the axial direction are formed in a repeated fashion in the circumferential direction in the side face of one of the bar-shaped section and the hole that has greater hardness. The other of the side face of the bar-shaped section and the side face of the hole that has lower hardness swells out into the spaces between the peak sections.

DESCRIPTION OF THE PREFERRED EMBODIMENTS

First Embodiment

Figure 1:
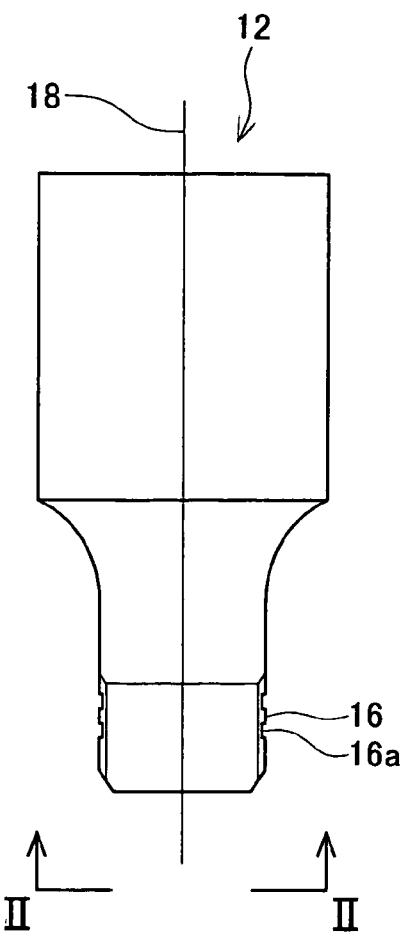
FIG. 1 is a side view diagram of a bar-shaped member.

Firstly, the principal characteristics of the first embodiment described below will be stated.

(Characteristic feature 1) A group of projections 16 which extend in the direction of the axis 18 and repeat in the circumferential direction are formed on the lower end side of a bar-shaped member 12. The projections 16 each comprise a uniform height portion 19 in which the height of the peak is uniform, and a varied height section 20 in which the height of the peak gradually changes in an uniform (constant) manner in the upward direction. A plurality of recess sections 16a are formed in the uniform height portion 19 of each projection 16, and hence the peak of the projection extends in an intermittent fashion in the uniform height portion 19 of the projection 16. A tapered face 41 having a circular lateral cross-section and which gradually increases uniformly (constantly) its radius in the upward direction is provided below the projections 16.

(Characteristic feature 2) A pair of first abutting faces 25 which extend in the axial direction and the circumferential direction are formed on the bar-shaped member 12. One first abutting face 25 and the other first abutting face 25 are disposed at symmetrical positions on either side of the axis 18 of the bar-shaped member 12. Moreover, a pair of second abutting faces 26 which are displaced in phase by 90 degrees with respect to the first abutting face 25 and which extend in the axial direction and the circumferential direction are formed on the bar-shaped member 12.

(Characteristic feature 3) The bar-shaped member 12 is made from a material having greater hardness than the tubular member 14.

(Characteristic feature 4) The tubular member is set in a circular recess of a molding jig.

A first embodiment of the present invention is described below with reference to the drawings. In the present embodiment, the bar-shaped member 12 shown in FIG. 1 and the tubular member 14 shown in FIG. 2 are fastened together by pressure fitting. Below, the upper and lower directions in FIG. 1 are determined to correspond to the upper and lower directions of the bar-shaped member 12 and tubular member 14.

Figure 2:
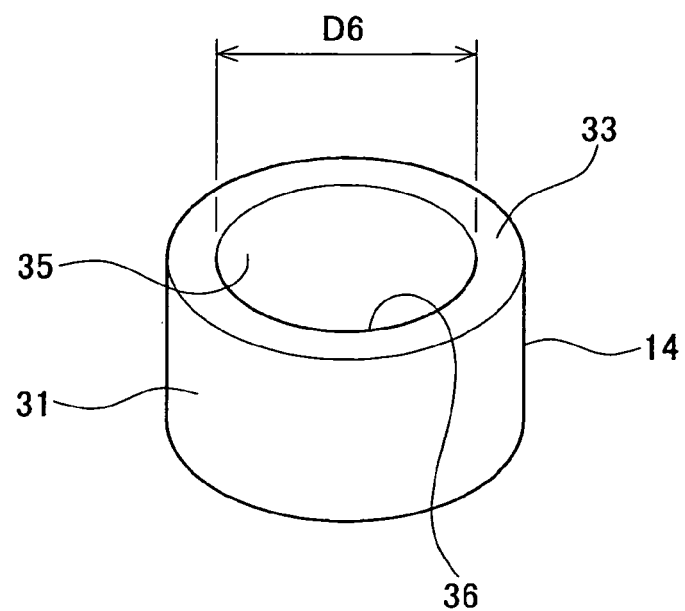
FIG. 2 is an oblique diagram of a tubular member.
Figure 3:
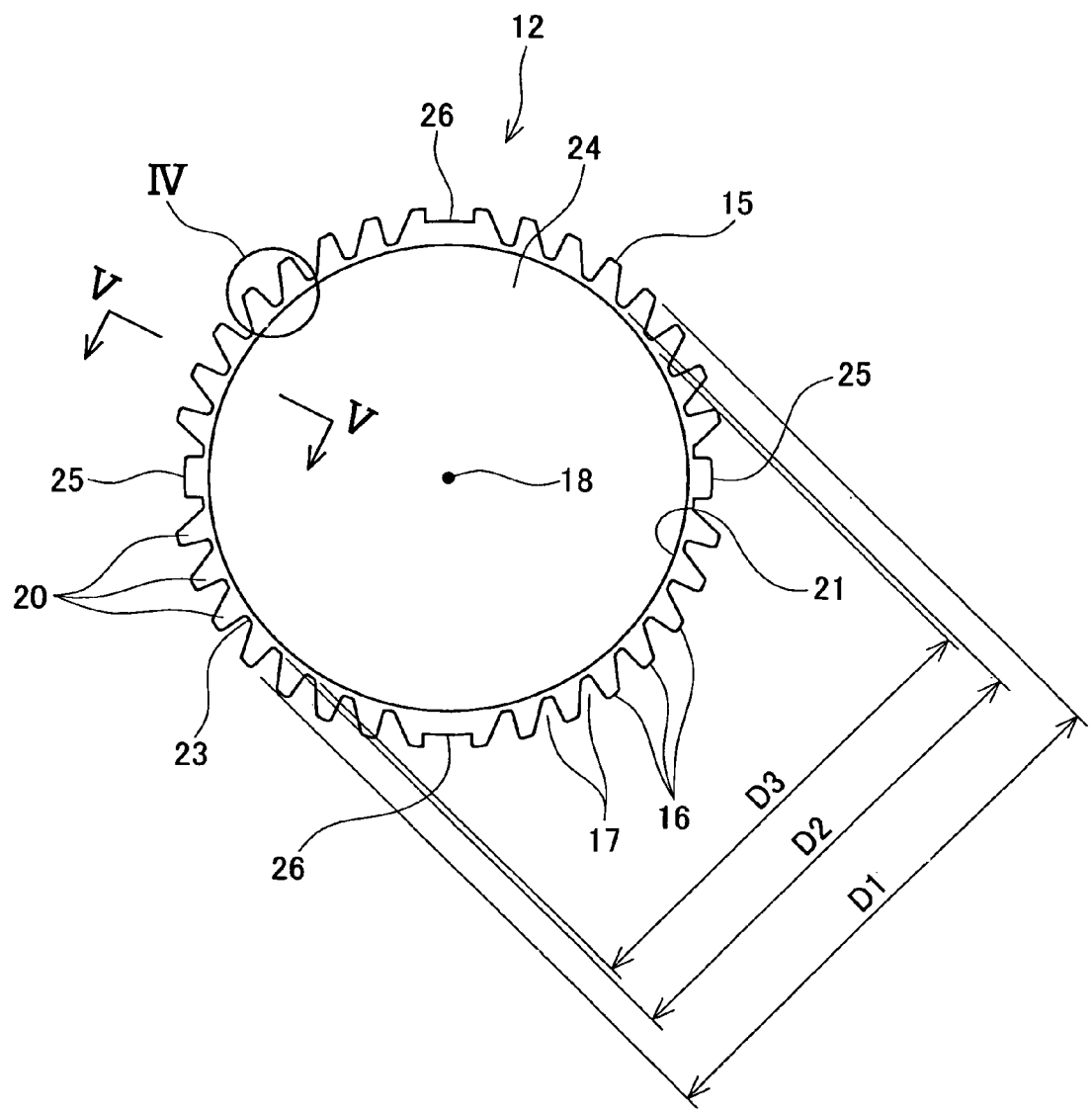
FIG. 3 shows a diagrammatic view in the direction of line III-III in FIG. 1.

As shown in FIG. 1 and FIG. 3, a group of projections 16 (serrations) which extend in the direction of the axis 18 and repeat in the circumferential direction are formed on the lower end side of the bar-shaped member 12. Grooves 17 are formed between respective projections 16.

Figure 4:
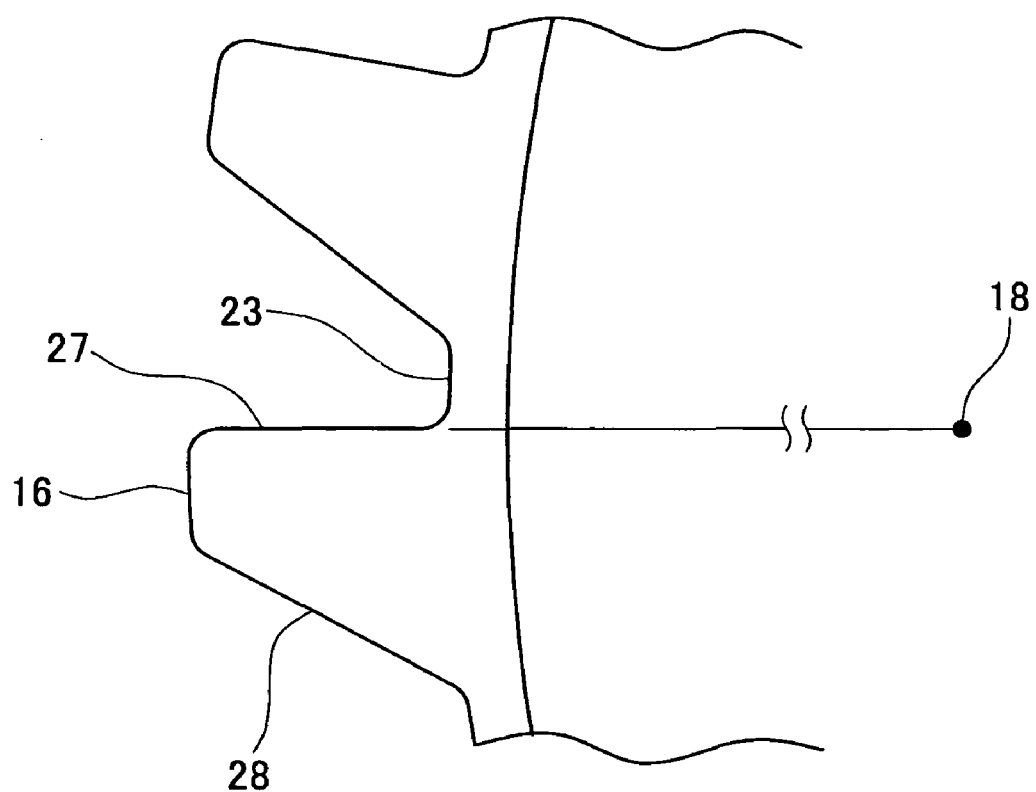
FIG. 4 is a detailed diagram of portion IV in FIG. 3.

As shown in FIG. 4, one side face 27 of each projection 16 coincides with the diametrical direction. The other side face 28 of each projection 16 is inclined with respect to the side face 27. Two side faces 27 and 28 which extend to either side in the circumferential direction from the peak of the projection 16 are formed at asymmetrical position with respect to the radius passing through the axis 18 and the peak of the projection.

Figure 5:
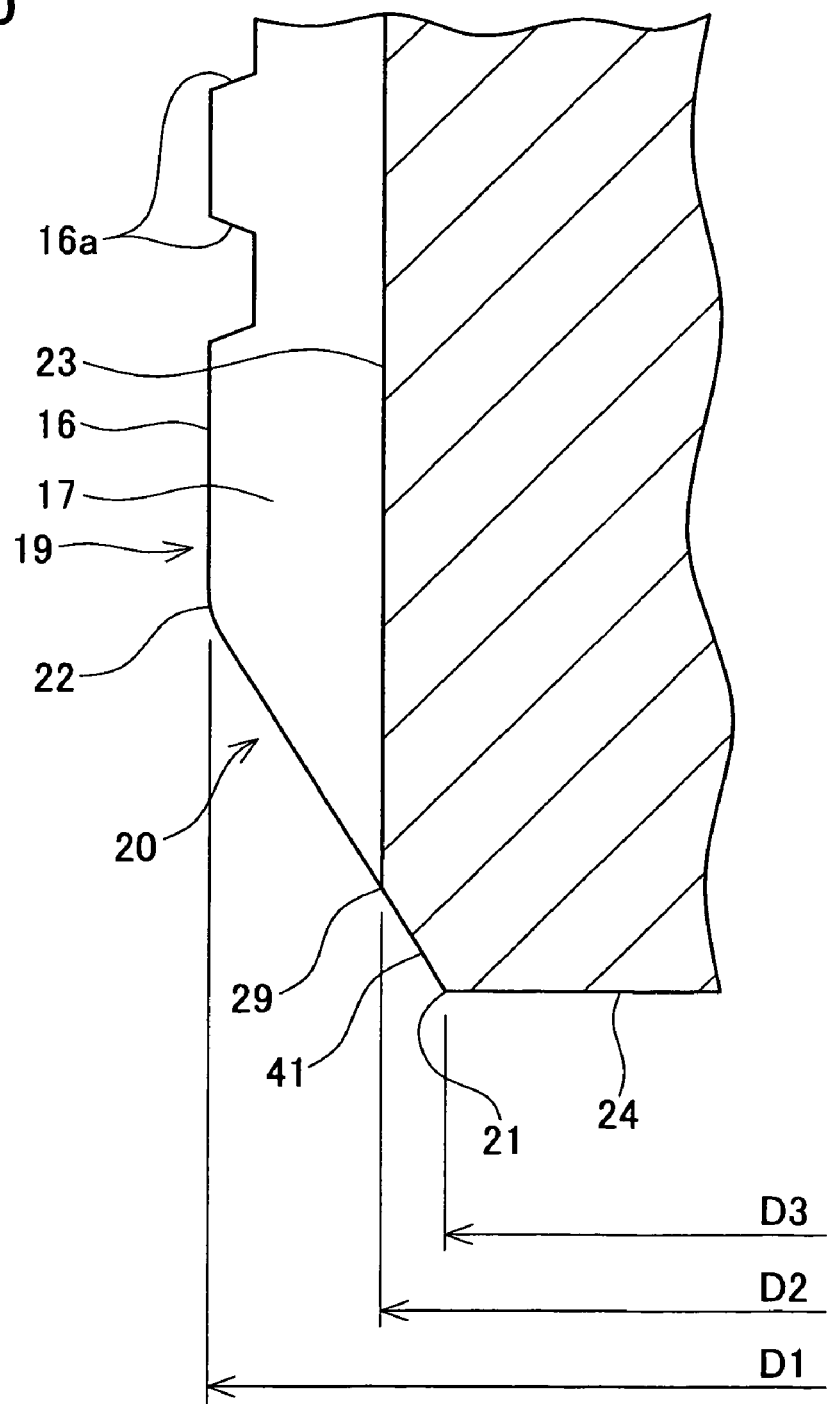
FIG. 5 is a cross-sectional view along line V-V in FIG. 3.

As shown in FIG. 5, each projection 16 comprises a portion 19 in which the height of the peak is uniform and unchanging (hereinafter, called "uniform height portion 19") and a portion 20 (hereinafter, called "height changing section 20") in which the height of the peak increases (changes) uniformly toward the upper side. A radius (rounded shape) is applied to the upper end portion 22 of the height changing section 20, in other words, the portion where the varied height section 20 merges with the uniform height section 19. Recess sections 16a are provided at a plurality of positions in the uniform height section 19 of the projections 16. In the uniform height section 19 of each projection 16, the peak of the projection 16 is divided by the recess sections 16a and hence the peak of the projection 16 extends in an intermittent fashion in the axial direction. Here, the recess sections 16a can be provided in each one of the group of projections 16 which are arranged in the circumferential direction or they can be provided in only a portion of the group of projections 16 which are arranged in the circumferential direction.

Below the projections 16, a taper-shaped section 41 (called "tapered face 41" below) is provided, which has a circular cross-section and the radius of which increases uniformly in the upward direction. The varied height sections 20 of the projections 16 join to the tapered face 41 by means of the height becoming zero at the end 29 of each projection 16. The tapered face 41 successively merges with the front end face 24 which is formed on the front end.

The shape of the side face of the height changing section 20 of the projection 16 and the tapered face 41 is a straight line in FIG. 5, but the shape is not limited to this. For example, the side face of the height changing section 20 and the tapered face 41 may have a curved shape. The upper end section 22 of the height changing section 20 of the projections 16 should continue smoothly from the uniform height section 19, but does not necessarily have to be formed with a radius shape.

As shown in FIG. 3, a pair of first abutting faces (walls) 25 which extend in the axial direction 18 are formed on the bar-shaped member 12. The one first abutting face 25 and the other first abutting face 25 are disposed at symmetrical positions on either side of the axis 18 of the bar-shaped member 12. Supposing that the surface of the first abutting face 25 composes a part of an imaginary round bar having a center on the axis 18 of the bar-shaped member 12, then the surfaces of the first abutting faces 25 coincide with the outer circumferential surface thereof. Moreover, similarly disposed second abutting faces 26 which have the same shape as the first abutting face 25 are formed on the bar-shaped member 12. The first abutting faces 25 and the second abutting faces 26 are displaced by 90 degrees in phase.

The diameter D1 of the circumscribed circle which circumscribes the cross-section perpendicular to the axis 18 of the bar-shaped member 12 (hereinafter, simply called the outer diameter D1) is designed to be of a diameter which is greater than the inner diameter D6 of the tubular member 14 (see FIG. 2). The diameter D3 of the front end face 24 of the bar-shaped member 12 is designed to be of a dimension smaller than the inner diameter D6 of the tubular member 14. The diameter of the inscribed circle which inscribes the cross-section perpendicular to the axis 18 of the bar-shaped member 12, i.e. the diameter of the circle which includes the bottom faces 23 of each of the grooves 17 of the bar-shaped member 12 (called the "bottom face diameter D2" below), is designed to be of a dimension greater than the inner diameter D6 of the tubular member 14. The bottom face diameter D2 can also be designed to be of a dimension smaller than the inner diameter D6 of the tubular member 14.

The bar-shaped member 12 is a cast component and is made from a material having greater hardness than the tubular member 14. It is also possible to carry out high-frequency quenching, or the like, of the projections 16 of the bar-shaped member 12 and the base portion of the projections 16, so as to improve the hardness of the projections 16 and the base portion thereof above that of the tubular member 14. The bar-shaped member 12 and the tubular member can, for example, be made of steel, aluminum, copper, or the like.

Figure 6:
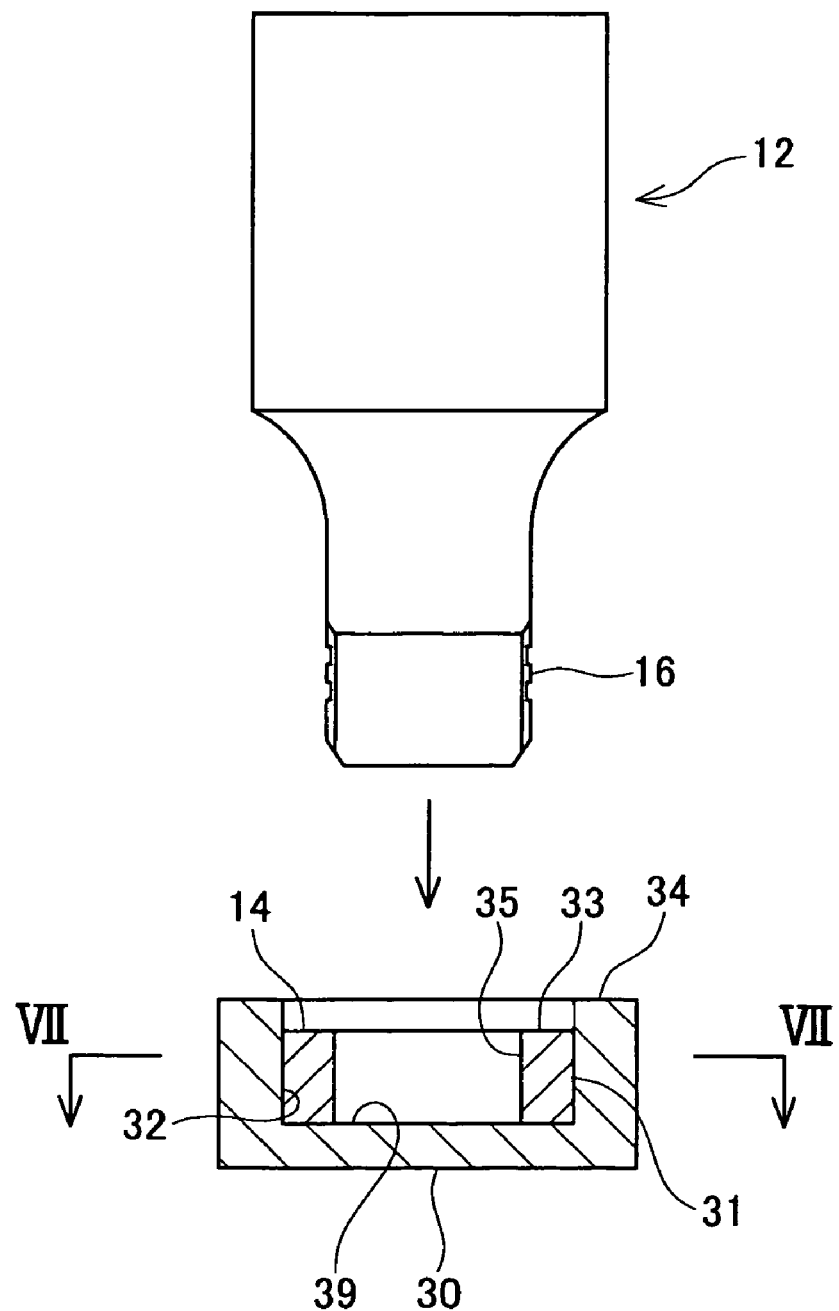
FIG. 6 shows a state where a bar-shaped member is disposed above a tubular member set in a molding jig.
Figure 7:
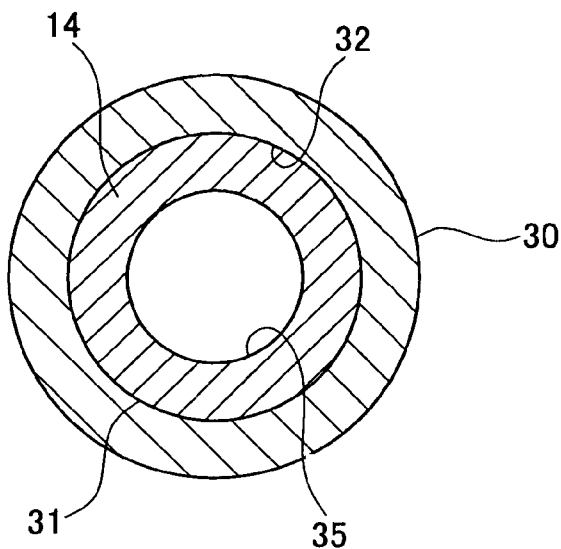
FIG. 7 is a cross-sectional view along line VII-VII in FIG. 6.

To prepare for the fastening of the bar-shaped member 12 and the tubular member 14, the tubular member 14 is set in a circular recess 39 of a molding jig (die) 30, as shown in FIG. 6 and FIG. 7. The upper surface 33 of the tubular member 14 is disposed at a lower position than the upper surface 34 of the molding jig 30. The tubular member 14 is set in the molding jig 30 in a state where virtually no gap is formed between the outer circumferential surface 31 of the tubular member 14 and the inner circumferential surface 32 of the molding jig 30. The molding jig 30 is fixed to a supporting platform (not illustrated).

Figure 8:
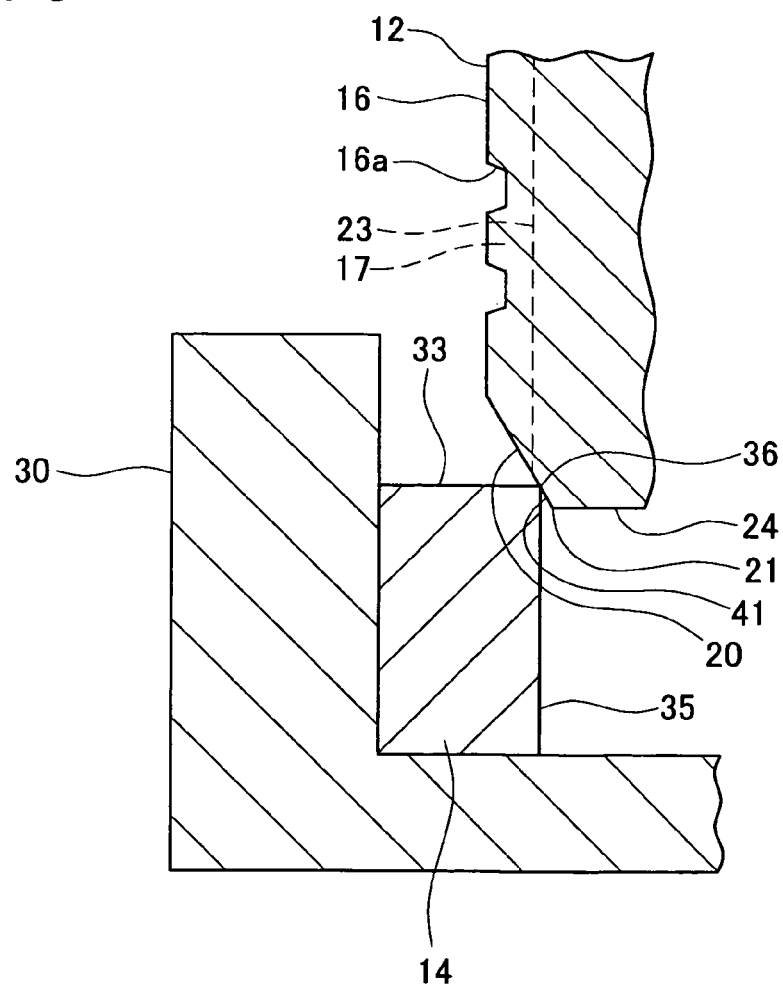
FIG. 8 is a cross-sectional diagram showing a state where the bar-shaped member that has been lowered has made contact with the tubular member.

As shown in FIG. 6, the bar-shaped member 12 is disposed in a state where it is held by an elevator mechanism (not illustrated) above the tubular member 14 which has been set in the molding jig 30. When the bar-shaped member 12 and the tubular member 14 are fastened together, the bar-shaped member 12 is moved downwards. As stated above, the diameter D3 of the front end face 24 of the bar-shaped member 12 is designed to be of a dimension smaller than the inner diameter D6 of the tubular member 14. Consequently, when the bar-shaped member 12 is moved downwards, then as shown in FIG. 8, the tapered face 41 of the bar-shaped member 12 makes contact with the top edge 36 of the inner circumferential surface of the tubular member 14. Furthermore, the bottom face diameter D2 of the grooves 17 is designed to be of a dimension greater than the inner diameter D6 of the tubular member 14. Therefore, when the bar-shaped member 12 is moved downwards and the tapered surface 41 makes contact with the upper edge 36 of the inner circumference of the tubular member 30, in terms of the positional relationships in the horizontal direction, the inner circumferential surface 35 of the tubular member 14 is disposed to the inner side (axial side) of the bottom faces 23 of the grooves 17.

Figure 9:
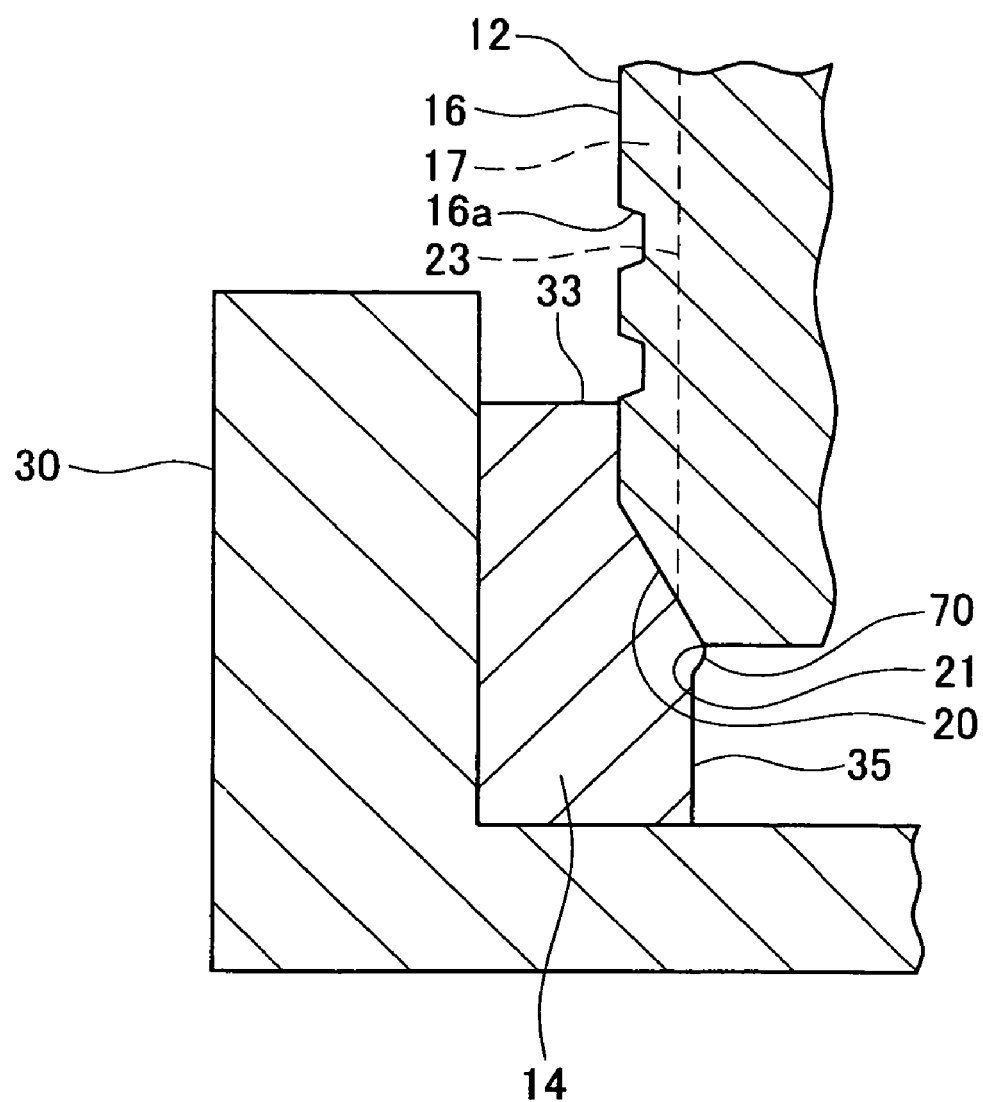
FIG. 9 is a cross-sectional diagram showing a state during the pressure fitting of the bar-shaped member into the tubular member.

FIG. 9 shows a state where the bar-shaped section 12 has been moved further downwards. Since the peaks of the projections 16 of the bar-shaped member 12 are shorter on the upper side than on the lower side, and furthermore the bar-shaped member 12 has greater hardness than the tubular member 14, the projections 16 descend so as to carve into the tubular member 14 while causing the tubular member 14 to undergo plastic deformation. In this case, the projections 16 also undergo plastic deformation, but to a lesser extent than the tubular member 14. Since the varied height section 20 and the tapered face 41 in which the side faces have an inclined shape are provided in the bar-shaped member 12, the portion of the tubular member 14 which undergoes plastic deformation does not flow to a great extent downwards, but pliably flow and enter into the grooves 17. Since the tubular member 14 flows downwards to some degree, then a portion 70 which has deformed plastically in a bulging shape is formed on the tubular member 14 (this portion 70 which has deformed plastically in a bulging shape is omitted from the drawings described below).

Figure 10:
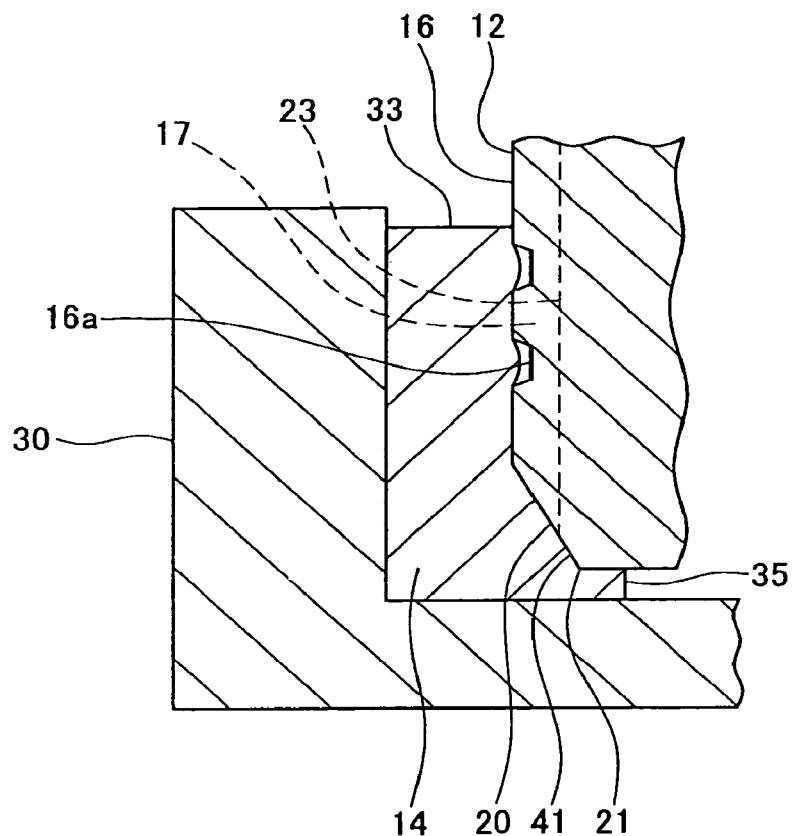
FIG. 10 is a cross-sectional diagram showing a state where the bar-shaped member has been pressure fitted into the tubular member.
Figure 11:
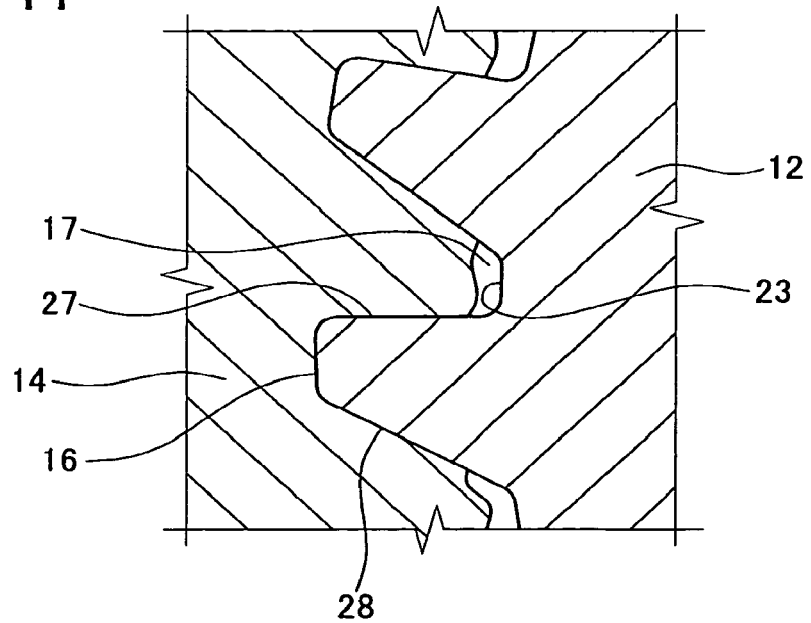
FIG. 11 is a cross-sectional diagram showing a state where the material of the tubular member has entered into the grooves between the projections of the bar-shaped member.

FIG. 10 shows a state where the bar-shaped member 12 has reached the lowermost position and has thereby halted progressing. Since the projections 16 of the bar-shaped member 12 cause the tubular member 14 to deform plastically and the tubular member 14 is set in a molding jig 30 and cannot deform toward the outer side, then the upper face 33 of the tubular member 14 is disposed at a higher position than before undergoing deformation. Furthermore, the inner circumferential surface 35 of the tubular member 14 is disposed further toward the inner side than before undergoing deformation. As shown in FIG. 11, the plastically deformed portion of the tubular member 14 enters sufficiently into the grooves 17 of the bar-shaped member 12. Furthermore, both of the deformed portions are processed and cured due to the plastic deformation of the projections 16 of the bar-shaped member 12 and the vicinity of the portion of the tubular member 14 into which the projections 16 have engraved. Therefore, the hardness of the plastically deformed portion is strengthened. Consequently, the bar-shaped member 12 and the tubular member 14 are fastened together strongly due to the fact that the plastically deformed portion of the tubular member 14 enters sufficiently inside the grooves 17 of the bar-shaped member 12 and due to the processing and curing which accompany this plastic deformation. Furthermore, the inner circumferential surface 35 of the tubular member 14 which has deformed in a malleable manner into the recess sections 16a provided on the projections 16 swells out and the elastically deformed portion of the tubular member 14 enters in between the peaks of the respective projections 16 which extend intermittently in the direction of the axis 18. By this configuration, the fastening force of the bar-shaped member 12 and the tubular member 14 in the axial direction is increased.

As described previously, one side face 27 of the projections 16 coincides with the diametrical direction and the other side face 28 of the projections 16 is inclined with respect to the one side face 27. Therefore, the fastening strength of the bar-shaped member 12 and the tubular member 14 in respect of axial rotation varies depending on the direction of action of the torque. For example, in FIG. 11, when the tubular member 14 is fixed, then a greater fastening strength is obtained if a torque were applied to the bar-shaped member 12 in the clockwise direction than if a torque were applied to the bar-shaped member 12 in the counter-clockwise direction. This is because the other side faces 28 of the projections 16 are inclined with respect to the diametrical direction, and therefore slippage between the bar-shaped member 12 and the tubular member 14 is more liable to occur when a torque is applied to the bar-shaped member 12 in the counter-clockwise direction.

As described above, when the bar-shaped member 12 is moved downwards and the tapered face 41 makes contact with the upper edge 36 of the inner circumference of the tubular member 14, then the inner circumferential surface 35 of the tubular member 14 is disposed to the inner side of the bottom faces 23 of the grooves 17. The diameter D3 of the front end face 24 of the bar-shaped member 12 and the bottom face diameter D2 of the bottom faces 23 are determined in such a manner that this relationship is guaranteed even if the inner diameter D6 of the tubular member 12 may vary. Consequently, even if there is variation in the internal diameter D6 of the tubular member 12, when the bar-shaped member 12 makes contact with the upper edge 36 of the inner circumference of the tubular member 14, then in the positional relationships in the horizontal direction, no gap occurs between the inner circumferential surface 35 of the tubular member 14 and the bottom faces 23 of the grooves 17. If no gaps occur between the inner circumferential surface 35 of the tubular member 14 and the bottom faces 23 of the grooves 17, then when the bar-shaped member 12 is moved further downwards and the tubular member 14 has deformed, the plastically deformed portion enters sufficiently into the grooves 17.

The distance between the one first abutting face 25 and the other first abutting face 25 of the bar-shaped member 12, and the distance between the one second abutting face 26 and the other second abutting face 26 are determined so as to be slightly larger than the internal diameter D6, even if there is variation in the internal diameter D6 of the tubular member 14. Therefore, when the bar-shaped member 12 is moved downwards and the projections 16 carve into the tubular member 14, the first abutting faces 25 and the second abutting faces 26 abut face-to-face respectively with the inner circumferential surface 35 of the tubular member 14. Since the first abutting faces 25 and the second abutting faces 26 merely abut with the surface of their counterpart, they do not carve into the tubular member 14 as the projections 16 do. Therefore, the bar-shaped member 12 and the tubular member 14 are mutually guided by the inner circumferential surface 35, the first abutting faces 25 and the second abutting faces 26, and hence their respective axes coincide accurately with each other.

As stated above, a curved radius is provided on the upper end portion 22 of the varied height section 20 of the projections 16. Therefore, it is possible to restrict sudden decline in the force pushing the bar-shaped member 12 downwards, when the bar-shaped member 12 is moved downward and the members transfer from a state in which only the varied height sections 20 of the projections 16 are in contact with the tubular member 14 to a state in which the uniform height sections 19 of the projections 16 are additionally in contact with the tubular member 14. Therefore, the speed of the lowering movement of the bar-shaped member 12 can be controlled easily. It is also possible to determine change in the force which causes the bar-shaped member 12 to descend and to maintain a position of descent of the bar-shaped member 12 from this change. By adopting this composition, it is possible to achieve a more accurate fastening operation than if the pressure fitting process is controlled on the basis of the distance of movement of the bar-shaped member 12.

The phase difference between the pair of first abutting faces 25 and the pair of second abutting faces 26 is not limited to 90 degrees. Even if the phase difference is an angle other than 90 degrees, the abutting faces 25 and 26 are able to ensure that the axis of the bar-shaped member 12 and the axis of the tubular member 14 coincide accurately with each other. The surfaces such as the first abutting faces 25 and the second abutting faces 26 can also be provided in five or more positions. By providing a plurality of abutting faces and arranging their positions in such a manner that the vector sum of the forces acting on the abutting faces is zero during the pressure fitting process, then it is possible to make the axis of the bar-shaped member 12 and the axis of the tubular member 14 coincide accurately with each other.

The bar-shaped member 12 is not limited to a round bar shape, and may also have a square bar shape. If a plurality of square sections extending in the axial direction are present on the side faces of a square-shaped bar, then the peaks of these square sections perform a similar function to the peaks of the projections described above. In this case, at least one recess section should be provided in the square sections which are present in the side faces of the square shape, in such a manner that the peaks of the square sections extend in an intermittent fashion in the axial direction. By this means, when the bar-shaped member 12 is pressure fitted into the tubular member 14, the tubular member 14 deforms elastically and enters into the recess sections, thereby making it possible to increase the fastening force of the bar-shaped member 12 and the tubular member 14 in the axial direction.

Second Embodiment

In the present embodiment, another specific example of the bar-shaped member is described. Similarly to the bar-shaped member 12 of the first embodiment described above, the bar-shaped member 112 described in the present embodiment can also be fastened strongly to a tubular member 14 (see FIG. 2), for example, by being pressure fitted in a likewise manner.

Figure 12:
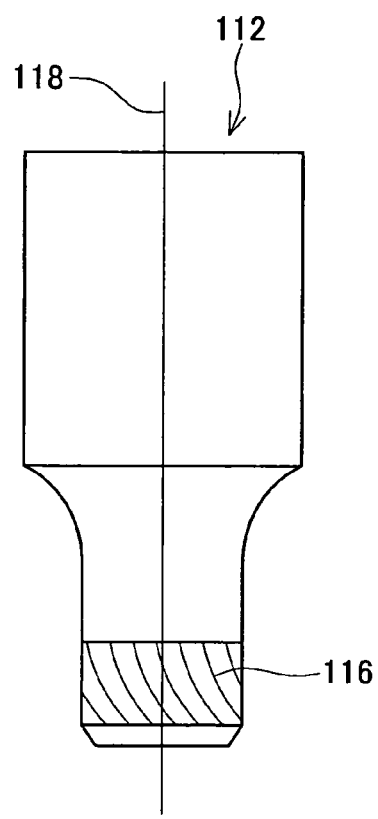
FIG. 12 is a side view diagram of a bar-shaped member according to a second embodiment.

As shown in FIG. 12, a group of projections 116 which extend in an oblique direction with respect to the direction of the axis 118 and repeat in the circumferential direction are formed on the lower end side of the bar-shaped member 112. In other words, a plurality of projections 116 are formed in a helical gear shape on the lower end side of the bar-shaped member 112.

When the bar-shaped member 112 is pressure fitted into the tubular member 14, the projections 116 pierce into the tubular member 14 and cause the tubular member 14 to deform plastically by a large degree. The plastically deformed section of the tubular member 14 thereby enters sufficiently into the grooves between projection 116 and projection 116. The grooves between the projections 116 extend obliquely with respect to the direction of the axis 118. Consequently, the bar-shaped member 112 and the tubular member 14 are firmly fastened together in the circumferential direction as well as in the axial direction.

Third Embodiment

In the present embodiment, another specific example of the bar-shaped member is described. Similarly to the bar-shaped member 12 of the first embodiment described above, the bar-shaped member 212 described in the present embodiment can also be fastened strongly to a tubular member 14 (see FIG. 2), for example, by being pressure fitted in a likewise manner.

Figure 13:
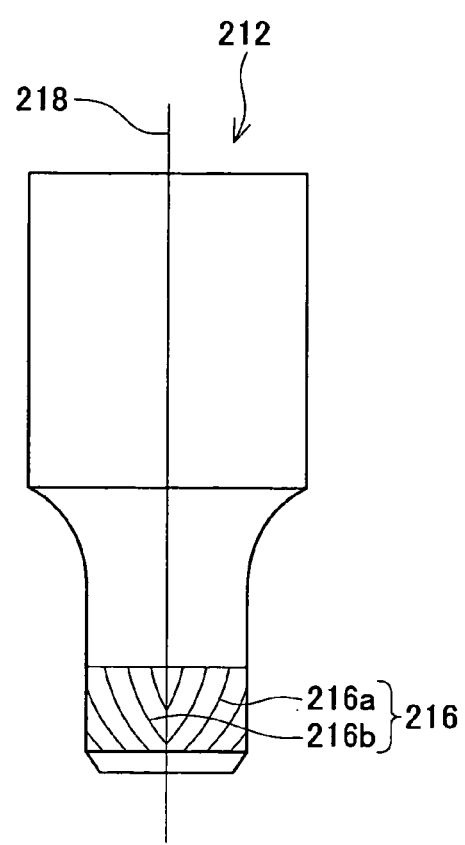
FIG. 13 is a side view diagram of a bar-shaped member according to a third embodiment.

As shown in FIG. 13, a group of projections 216 which extend in an oblique direction to the direction of the axis 218 and repeat in the circumferential direction are formed on the lower end side of the bar-shaped member 212. In a halved circumference portion of the bar-shaped member 212 (the right-hand half in FIG. 13), the group of projections 216a extends in a rightward screw direction. In the other halved circumference portion of the bar-shaped member 212 (the left-hand half in FIG. 13), the group of projections 216b extend in a leftward screw direction. The group of projections 216a formed on the one half circumference portion of the bar-shaped member 212 and the group of projections 216b formed on the other half circumference portion of the bar-shaped member 212 have mirror symmetry with respect to each other.

When the bar-shaped member 212 is pressure fitted into the tubular member 14, then the projections 216 pierce into the tubular member 14 and cause the tubular member 14 to deform plastically by a large degree. The plastically deformed section of the tubular member 14 thereby enters sufficiently into the grooves between projection 216 and projection 216. The grooves between the projections 216 extend obliquely with respect to the direction of the axis 118. Consequently, the bar-shaped member 212 and the tubular member 14 are fastened together strongly in the circumferential direction and the axial direction. In particular, in on of the halved circumference portion of the bar-shaped member 212, the grooves between projection 216a and projection 216a extend in a rightward screw direction, and therefore the bar-shaped member 212 is strongly restricted from turning in one direction with respect to the tubular member 14. Furthermore, in the other halved circumference portion of the bar-shaped member 212, the grooves between projection 216b and projection 216b extend in a leftward screw direction, and therefore the bar-shaped member 212 is strongly restricted from turning in the other direction with respect to the tubular member 14. Consequently, the bar-shaped member 212 and the tubular member 14 are fastened together strongly in the either of the circumferential directions.

Fourth Embodiment

In the present embodiment, another specific example of the bar-shaped member is described. Similarly to the bar-shaped member 12 of the first embodiment described above, the bar-shaped member 312 described in the present embodiment can also be fastened strongly to a tubular member 14 (see FIG. 2), for example, by being pressure fitted in a likewise manner.

Figure 14:
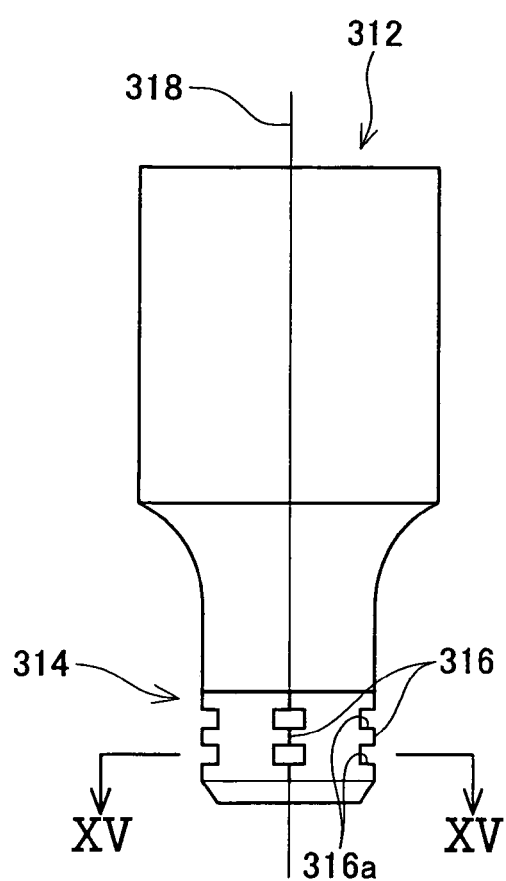
FIG. 14 is a side view diagram of a bar-shaped member according to a fourth embodiment.
Figure 15:
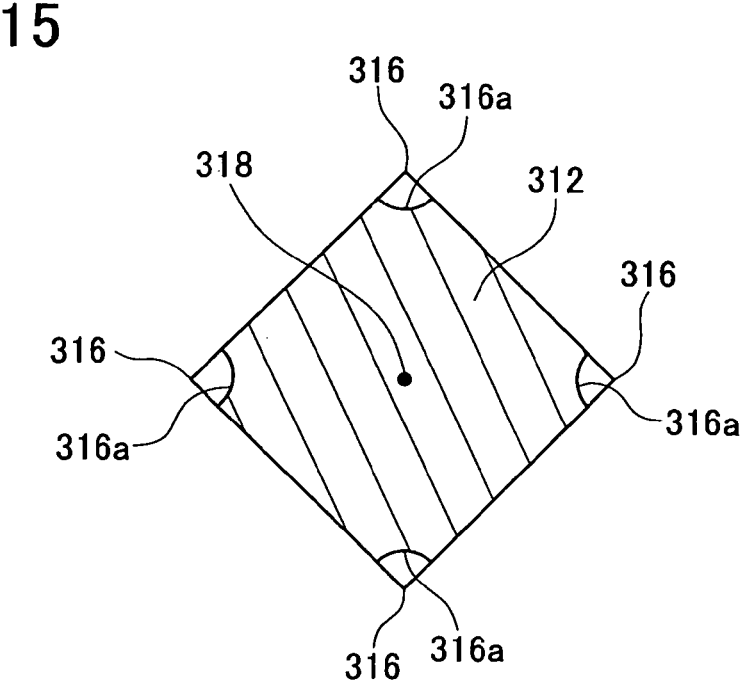
FIG. 15 is a cross-sectional view along line XV-XV in FIG. 14.

As shown in FIG. 14 and FIG. 15, a square bar section 314 having a square cross-section perpendicular to the axis 318 is formed on the lower end side of the square-shaped member 312. Four peak sections 316 extend in the direction of the axis 318 on the side faces of the square bar section 314. Two recess sections 316a are formed in each of the peak sections 316. The peak sections 316 which extend intermittently in the direction of the axis 318 are formed in a repeated fashion in the circumferential direction, on the side faces of the square bar section 314 of the square-shaped member 312.

When the bar-shaped member 312 is pressure fitted into the tubular member 14, then the peak sections 316 pierce into the tubular member 14 and cause the tubular member 14 to deform plastically by a large degree. In this case, the tubular member 14 which had malleably deformed flows into the recess sections formed in the peak sections 316. Consequently, the bar-shaped member 312 and the tubular member 14 are fastened together strongly in the circumferential direction and the axial direction.

The square bar section 314 is not limited to having a square cross-section perpendicular to the axis 318 and it may also have a triangular, quadrilateral, pentagonal, hexagonal or cross-shaped cross-section perpendicular to the axis 318.

The fastening technology described in embodiments 1 to 4 above can be applied to fasten together members of various types.

Figure 16:
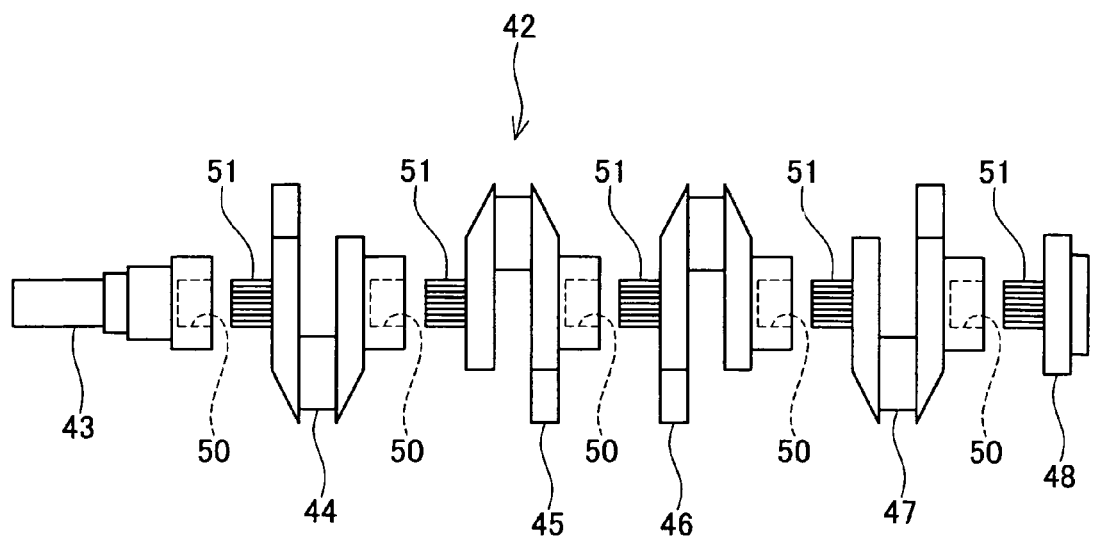
FIG. 16 shows a state before the fastening together of sub-components of a crankshaft.
Figure 17:
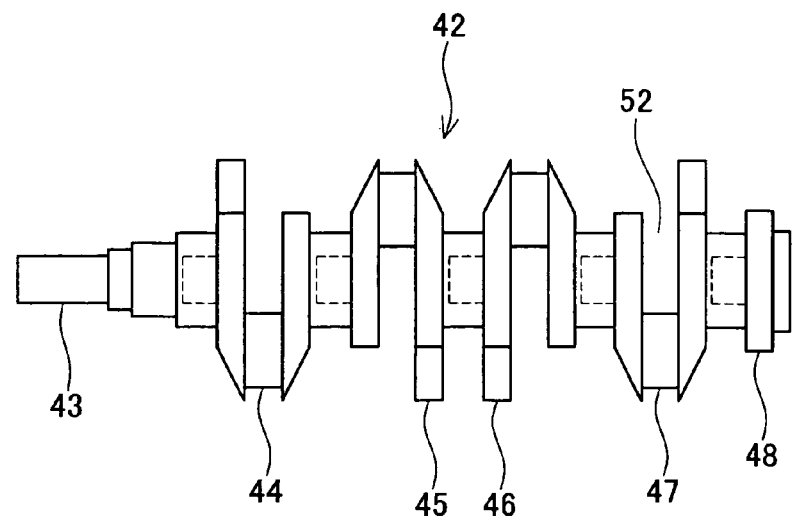
FIG. 17 shows a crankshaft in a state where sub-components have been fastened together by pressure fitting.

FIG. 16 shows a crank shaft 42 having sub-components 43 to 48. A hole section 50 is formed in the sub-component 43. Holes 50 and serrations 51 having a plurality of projections are formed respectively in the sub-components 44 to 47. A serration 51 is formed in the sub-component 48. Although not shown in the drawings, a plurality of recess sections are formed in the serrations 51, and hence the peaks of the serrations 51 extend in an intermittent fashion in the axial direction. FIG. 17 shows a state where the sub-components 43 to 48 are fastened together by pressure fitting the serrations 51 into the hole sections 50, thereby completing a crankshaft 42. The serrations 51 may also be formed so as to extend obliquely with respect to the axial direction, as in the second and third embodiments.

In the prior art, a crank shaft is manufactured as a single body. In this case, the gaps 52 indicated in FIG. 17 are processed by hot forging. Even if it is sought to reduce the width of the mold used to forge the gaps 52, there are limitations to such effort. Therefore, it has not been possible to reduce the length of the crankshaft in the axial direction. According to the fastening technology of the present invention, since the crankshaft 42 is completed by fastening together the sub-components 43 to 48, it is not necessary to process the gaps 52 by hot forging. Consequently, the length of the crankshaft 42 in the axial direction can be made shorter than in the prior art.

Furthermore, in the crankshaft of a V type engine, then a twisting process is required if the crankshaft is manufactured as a single body. According to the fastening technology of the present invention, since the positional relationship between the hole sections and the serrations in terms of axial rotation can adjusted during their fastening, then it is possible to omit the twisting step.

The sub-components 44 to 48 can each be made from a plurality of further subsidiary sub-components, and the technology of the present invention can also be applied to the fastening together such sub-components.

Figure 18:
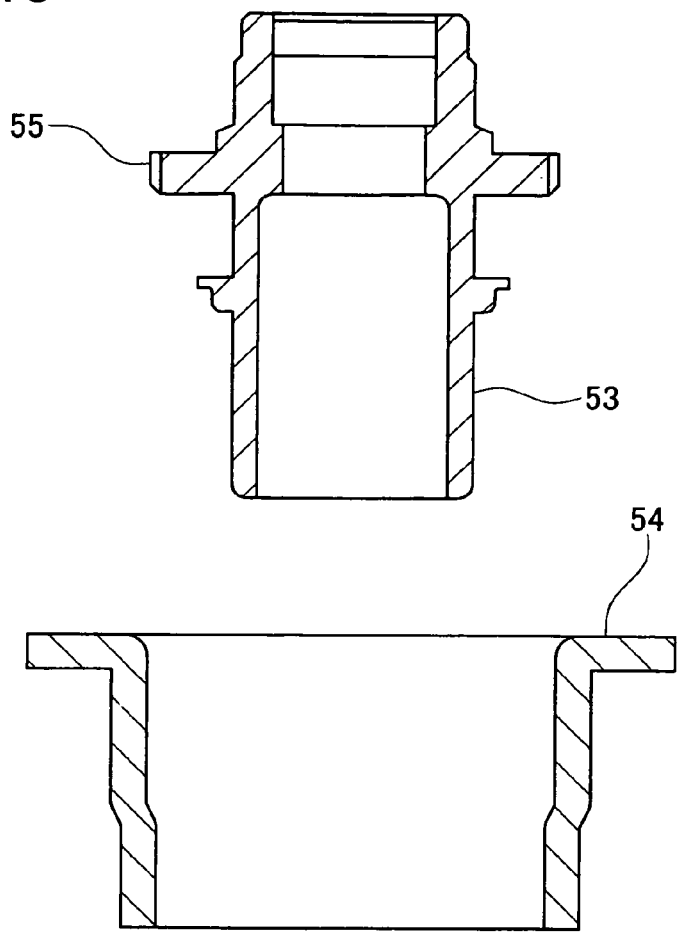
FIG. 18 is a cross-sectional diagram showing a state before the fastening together of a shaft section and a flange section of an electric motor.
Figure 19:
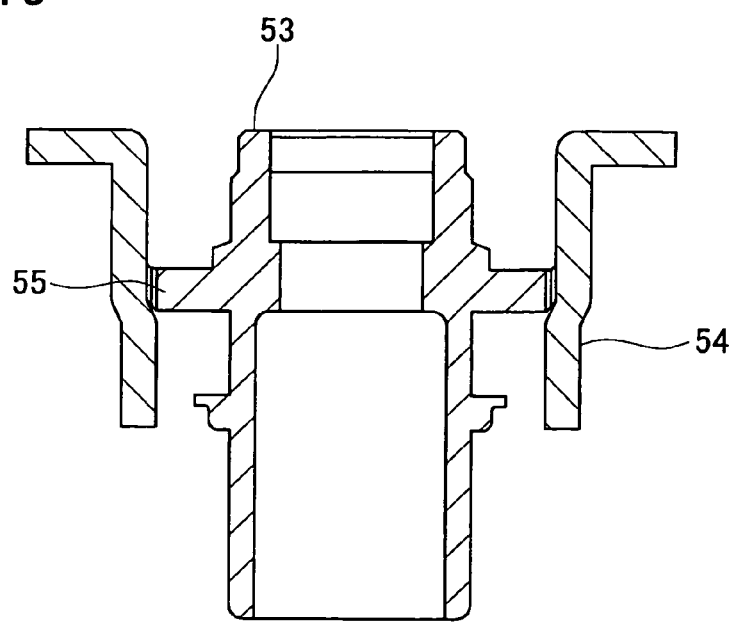
FIG. 19 is a cross-sectional diagram showing a state before the fastening together by pressure fitting of a shaft section and a flange section of an electric motor.

FIG. 18 shows a shaft section 53 and a flange section 54 of an electric motor. A serration 55 is formed in the shaft section 53. FIG. 19 shows a state where the shaft section 53 and the flange section 54 have been fastened together by means of the fastening technology according to the present invention.

Figure 20:
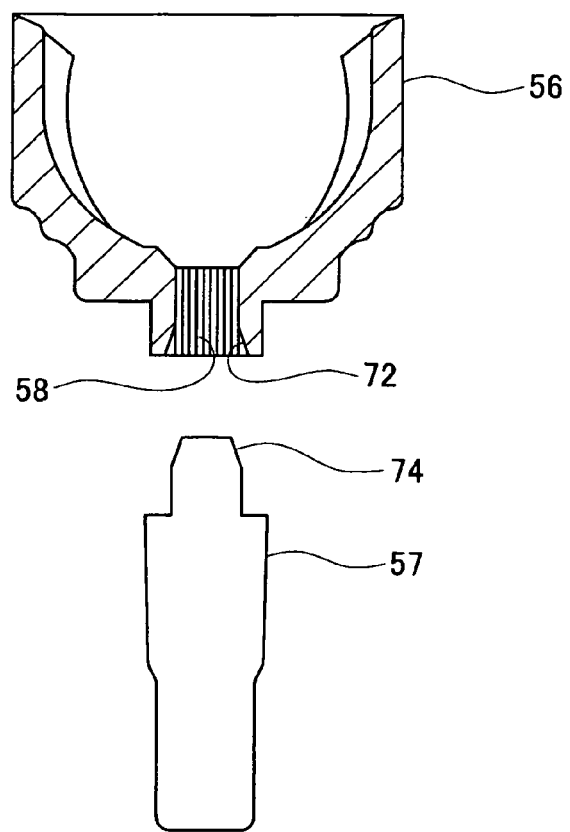
FIG. 20 is a cross-sectional diagram showing a state before the fastening together of an outer race and a tulip of a constant velocity joint.
Figure 21:
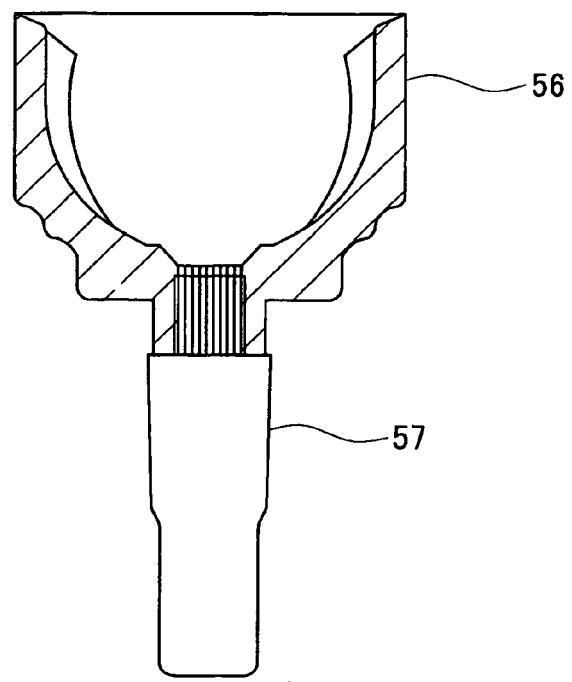
FIG. 21 is a cross-sectional diagram showing a state in which an outer race and a tulip of a constant velocity joint have been fastened together by pressure fitting.

FIG. 20 shows an outer race 56 and a tulip 57 of a constant velocity joint. The outer race 56 has a serration 58 formed on the inner circumferential surface thereof. The internal diameter of the serration of the outer race 56 increases gradually toward the opening, in the end portion 72 thereof. One end portion 74 of the tulip 57 decreases gradually in diameter. As shown in FIG. 21, the outer race 56 and the tulip 57 are fastened together by means of the fastening technology according to the present invention.

Figure 22:
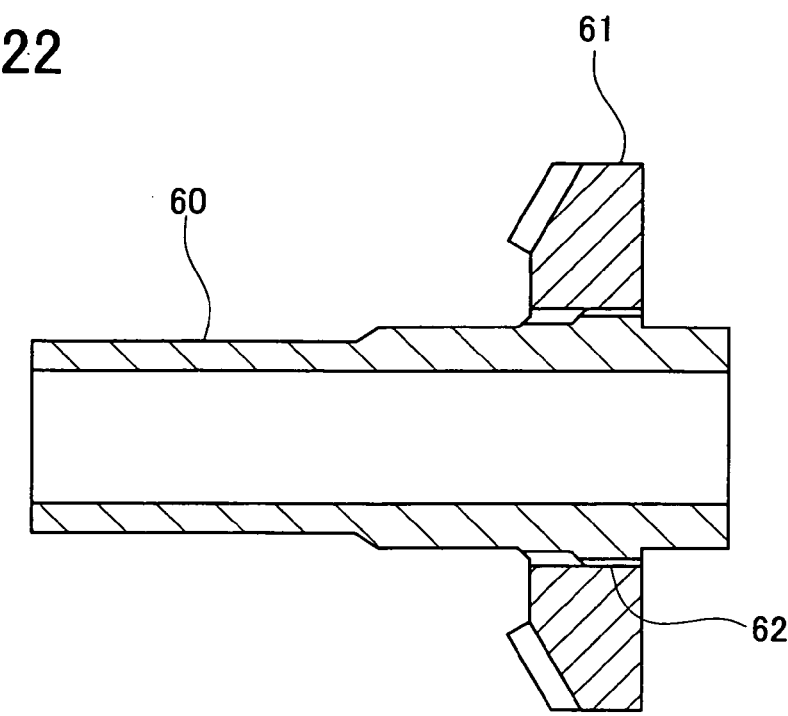
FIG. 22 is a cross-sectional diagram showing a state where a shaft and a ring gear have been fastened together by pressure fitting.
Figure 23:
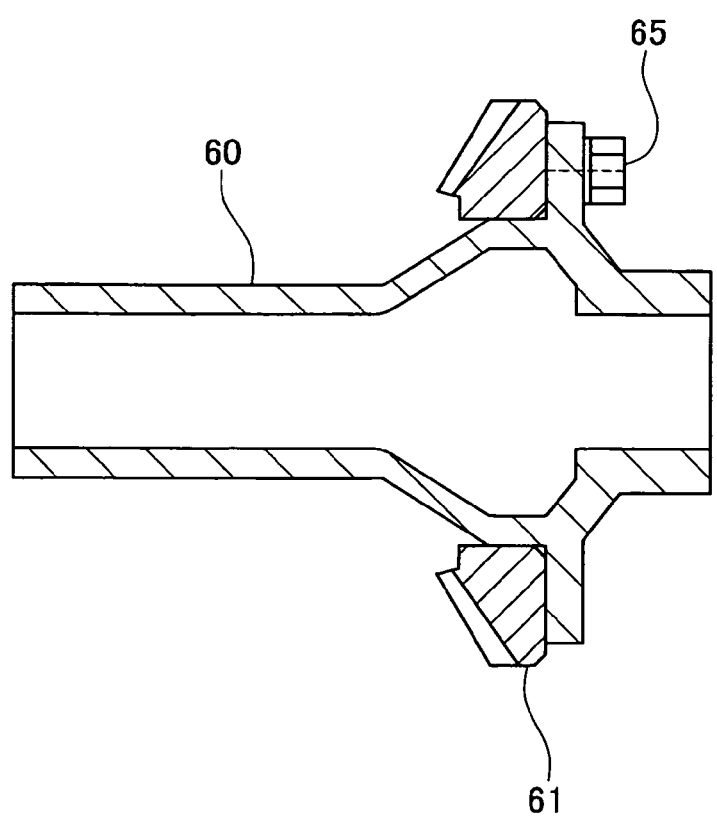
FIG. 23 is a cross-sectional diagram showing a state where a shaft and a ring gear have been fastened together by a bolt.

FIG. 22 shows a state where a shaft 60 and a ring gear 61 are fastened together by means of the fastening technology according to the present invention. A serration 62 is formed on the outer circumferential portion of the shaft section 60. On the other hand, if the fastening technology according to the present invention is not used, then the shaft 63 and the ring gear 61 must be fastened together by means of a bolt as shown in FIG. 23, and hence the number of components increases.

The fastening technology according to the present invention can also be applied suitably to the fastening together of the members stated below, for example, in addition to the foregoing examples.

(1) Fastening together of a rear axle shaft and flange (formed as a single body in the prior art). The manufacturing equipment can be reduced in size.
(2) Fastening together of an engine manifold and flange (joined by welding in the prior art). Joint reliability is improved.
(3) Fastening together of constituent elements of a steering mechanism (fastening by light pressure fitting using splines in the prior art). The fastening strength is improved.
(4) Fastening together of joint yoke and shaft in propeller shaft, or fastening together of components in a transmission mechanism (joined together by electron beam welding in the prior art). Costs can be reduced and fastening strength is improved.
(5) Fastening together of an axial component and a component having a shape comprising a trough and a flange (for example, the rear shaft of a vehicle).

By forming projections on the inner side of the tubular member and forming recess sections in these projections, it is possible to form peaks which extend intermittently in the axial direction on the inner circumferential surface of the tubular member. Alternatively, it is also possible to form peaks extending obliquely with respect to the axial direction, on the inner side of the tubular member. In this case also, it is possible to fasten the bar-shaped member and the tubular member together strongly in respect of both the circumferential direction and the axial direction.

Specific examples of the present invention were described in detail above, but these are no more than examples and do not limit the scope of the claims. The technology described in the claims includes various modifications and alterations of the specific examples which were described above.

Moreover the technical elements described in the specification and the drawings display technical usability either independently or in various combinations, and are not limited to the combinations stated in the claims in the present application. Furthermore, the technology described as examples in the present specification or drawings achieves a plurality of objects simultaneously, and has technical utility by achieving any one of these objects.

The invention claimed is:

1. A method of manufacturing an assembly member in which a first member and a second member are fastened together, the method comprising:
   forming an axially extending bar-shaped section on a first member;
   forming an axially extending hole in a second member;
   forming a plurality of projections which project radially outwardly from an annular side face of the bar-shaped section and extend in an axial direction of the bar-shaped section in a repeating spaced fashion in a circumferential direction on the side face,
   the projections extending in the axial direction each comprising a first portion in which radial height of the projection increases uniformly in the axial direction from a free end of the bar-shaped section towards the first member and a second portion extending from a peak of the first portion towards the first member in which the radial height of the projection remains uniform in the axial direction;
   forming at least one circumferentially extending recess in the second portion of each projection such that the peak of the projection extends intermittently in the axial direction; and
   axially aligning and pressure fitting the bar-shaped section formed on the first member into the hole formed in the second member, wherein:
   the side face of the bar-shaped section and the projections have a greater hardness than an annular side face of the hole,
   the hole being sized such that, during the pressure fitting, the side face of the second member plastically deforms to flow radially inward into engagement with the first portion of the projections and into the recesses and axially extending grooves defined between the projections of the first member such that an annular gap exists between a deformed portion of the second member and a bottom surface of the recesses and the side face of the bar-shaped section, and
   the deformed portion of the second member is hardened due to the plastic deformation.

2. An assembly fastening together a first member and a second member, comprising:
   an axially extending bar-shaped section formed on the first member;
   an axially extending hole formed in the second member into which the bar-shaped section is axially aligned and pressure fitted; and
   a plurality of projections which project radially outwardly from an annular side face of the bar-shaped section and extend in an axial direction of the bar-shaped section formed in a repeating spaced fashion in a circumferential direction on the side face,
   the projections extending in the axial direction each comprising a first portion in which radial height of the projection increases uniformly in the axial direction from a free end of the bar-shaped section towards the first member and a second portion extending from a peak of the first portion towards the first member in which the radial height of the projection remains uniform in the axial direction,
   at least one circumferentially extending recess formed in the second portion of each projection such that the peak sections of the projection extends intermittently in the axial direction, wherein:
   the side face of the bar-shaped section and the projections have a greater hardness than an annular side face of the hole,
   the hole being sized such that, during pressure fitting, the side face of the second member plastically deforms to flow radially inward into engagement with the first portion of the projections and into the recesses and axially extending grooves defined between the projections of the first member such that an annular gap exists between a deformed portion of the second member and a bottom surface of the recesses and the side face of the bar-shaped section, and
   the deformed portion of the second member is hardened due to the plastic deformation.

\* \* \* \* \*